United States Patent [19]

White

[11] Patent Number: 4,865,136

[45] Date of Patent: Sep. 12, 1989

[54] PRESSURE RELIEF VALVE FOR ROLLER BIT

[75] Inventor: James E. White, Arlington, Tex.

[73] Assignee: Cummins Engine Company, Columbus, Ind.

[21] Appl. No.: 104,785

[22] Filed: Oct. 5, 1987

[51] Int. Cl.⁴ .............................................. E21B 10/22
[52] U.S. Cl. ................... 175/227; 137/543.21; 175/228; 251/363; 251/364; 251/900; 384/93
[58] Field of Search .................... 175/227–229, 175/371, 372; 384/93; 184/39; 137/543.21, 516.29, 540, 511, 516.19, 516.27, 516.25, 543.23, 543.19, 543.17, 543.15; 251/364, 332, 900, 363, 333, 334, 337, 354, 357–359, 360–362, 365; 166/325

[56] References Cited

U.S. PATENT DOCUMENTS

| | | | |
|---|---|---|---|
| 1,240,461 | 9/1917 | Leinert | 137/543.17 X |
| 2,480,529 | 8/1949 | Waag | 251/900 X |
| 2,484,102 | 10/1949 | Valley | 251/363 |
| 2,908,293 | 10/1959 | Johnson | 251/333 X |
| 3,168,108 | 2/1965 | Patrick | 251/323 X |
| 3,476,195 | 11/1969 | Galle | 175/228 |
| 3,626,977 | 12/1971 | Riley et al. | 251/900 X |
| 3,735,825 | 5/1973 | Keller | 175/372 X |
| 4,019,785 | 4/1977 | Stinson et al. | 384/93 |
| 4,161,223 | 7/1979 | Oelke | 175/228 |
| 4,276,946 | 7/1981 | Millsapps, Jr. | 175/228 |
| 4,577,705 | 3/1986 | Cross | 175/228 |
| 4,593,775 | 6/1986 | Chaney et al. | 175/228 |

FOREIGN PATENT DOCUMENTS

| | | | |
|---|---|---|---|
| 1947093 | 3/1970 | Fed. Rep. of Germany | 137/543.21 |
| 1064159 | 5/1954 | France | 251/900 |
| 24662 | 2/1983 | Japan | 137/540 |
| 97787 | 4/1961 | Netherlands | 251/900 |
| 378626 | 7/1964 | Switzerland | 251/332 |
| 636365 | 12/1978 | U.S.S.R. | 175/227 |
| 887273 | 1/1962 | United Kingdom | 137/543.19 |

Primary Examiner—Hoang C. Dang
Attorney, Agent, or Firm—Browning, Bushman, Zamecki & Anderson

[57] ABSTRACT

A one-way pressure relief valve assembly is provided for venting the lubricant reservoir of a roller-type well drilling bit. The valve assembly is mounted in the cap of the lubricant reservoir, to open outwardly, and is adapted to provide hydrostatic loading of the valve element to its closed position.

24 Claims, 3 Drawing Sheets

PRESSURE RELIEF VALVE FOR ROLLER BIT

BACKGROUND OF THE INVENTION

The present invention pertains to a type of well drilling bit commonly referred to as a "roller cone" bit. This type of bit includes a bit body having a shank with an uppermost threaded pin whereby the bit can be connected to the lower end of a drill string. Several legs, typically three, extend downwardly from the shank. Each leg terminates in a bearing pin structure, and a respective roller cone-type cutter is rotatably mounted on each of these pin structures. The cone cutters, in turn, have teeth, tungsten carbide buttons, or other cutting structures on their outer surfaces. As the drill bit is rotated, and loaded by allowing a portion of the weight of the drill string to bear downwardly thereon, the cone cutters are caused to roll forcibly along the bottom of the borehole, drilling the formation, typically with a crushing type action.

Drilling fluid or mud is circulated downwardly through the drill string and through the bit to cool the cutters and carry the cuttings back upwardly through the well annulus formed between the borehole walls and the drill string.

As is well known, the cone cutters and bearing pin structures on which they are mounted, are provided with rotary bearings, and these bearings must be lubricated. In most of the roller cone bits currently in use today, a lubricant reservoir is provided in the bit body for each leg. A passageway leads from the reservoir to the respective bearing. A mud pressure port is provided through the bit body to expose the reservoir cavity to the pressure prevailing in the well, and a compensator, such as a diaphragm, is disposed in the reservoir, sealing thereacross, between the mud pressure port and the lubricant passage which leads to the bearing, the lubricant itself being located on the same side of the compensator as the lubricant passage. Thus, the pressure in the well will extend the diaphragm or other compensator so as to control the pressure differential thereacross and properly feed the lubricant into the bearing.

It has been found that pressure tends to build up in the lubricant reservoir and passageway as the bit is used. One explanation of this pressure build up is that, under the high temperatures and pressures which prevail downhole, the lubricant expands, and in addition, may begin to undergo a cracking process similar to that which is performed in petrochemical refinement processes. In any event, it is necessary to vent this excess pressure for various reasons, e.g. to prevent damage to the diaphragm, which could be forced through the mud pressure port, for example. On the other hand, it is not feasible to simply use an open vent, as the lubricant would be lost prematurely.

Prior U.S. Pat. No. 3,476,195 deals with the problem of venting excess lubricant pressures, especially in modern bits utilizing O-ring type bearing seals allowing little or no lubricant leakage. However, the system disclosed merely utilized an ordinary tire type pressure relief valve, and that valve was mounted, and as a practical matter, probably had to be mounted, in a special bore specifically formed for that purpose. Other criticisms of this system were that the valve would open at low pressures, thus allowing premature lubricant loss, e.g. due to surge effects while running the bit into the well.

U.S. Pat. No. 4,019,785 shows a similar elongate relief valve mounted directly in the lubricant feed passage of a bit which has no reservoir and compensator.

U.S. Pat. No. 4,161,223 addresses the problems of the system of U.S. Pat. No. 3,476,195 by providing a scheme in which the entire cap for the lubricant reservoir is itself a pressure relief valve. Nevertheless, there are still problems inherent in this system. In the first place, even though it was attempted to provide a valve which would only open at somewhat higher pressures, the fact that the entire reservoir cap itself served as the valve meant that that valve had relatively large surface areas on which the relevant pressures would act. Accordingly, the pressures at which this valve could, with reasonable design criteria, be made to open were still undesirably low. Furthermore, the fact that the entire reservoir cap had to move to open and close the valve allowed a much greater risk of debris entering the valve area, and thereby interfering with proper resealing or reseating of the valve after venting of the excess lubricant pressure.

U.S. Pat. No. 4,276,946 discloses a compensator diaphragm which attempts to eliminate the need for a relief valve by providing a void space.

SUMMARY OF THE INVENTION

The present invention provides a specialized one-way pressure relief valve assembly which is devised so that it can be mounted in the reservoir cap of the bit body assembly. This simultaneously avoids the complications of providing a special valve bore, and further avoids the undesirable effects of using the entire reservoir cap as a valve per se, while still allowing the use of a conventional reservoir and compensator.

The cap mounting of the valve is particularly salient, for various reasons. Conveniently, the same throughbore in the cap which is ultimately to receive the valve assembly can first be used to inject the lubricant into the reservoir, whereafter the valve assembly may be installed in the throughbore. The valve assembly is unique in that it is not only of minimized longitudinal extent (contrast U.S. Pat. No. 3,476,195) whereby it can be mounted in the cap, but also has relatively small laterally extending pressure bearing surfaces. For this reason, the valve can be designed so that it opens only at relatively high pressures. This high pressure operation not only fights premature lubricant loss, e.g. during running in, but also allows for much more precise control of the valve operation, e.g. by using a higher bias load, and permitting smaller tolerances on the metal parts.

The throughbore in the reservoir cap which receives the valve assembly has an annular outwardly facing shoulder. The valve assembly includes (beginning at its innermost end) a seat comprising an annular carrier and a resilient O-ring type seal carried on the inner diameter of the carrier. The longitudinal dimension of the O-ring is greater than the adjacent portion of the seat so that the opposite axial end surfaces of the O-ring are available for sealing engagement with the aforementioned cap shoulder, on one side, and a plate-like valve element, disposed on the opposite side of the seat from that shoulder.

The plate-like valve element is laterally oriented, so that it helps to reduce the longitudinal space required for the valve. The valve element simply slides within the throughbore of the reservoir cap, so that it can move longitudinally toward and away from the seat to open and close, yet without the need for a valve stem or the like for guidance, which further reduces the overall volume and number of parts needed for the valve assembly. The valve element has a solid central portion for sealing engagement with the O-ring. Although fluid can flow around the outer diameter of the valve element, fluid flow is further facilitated by longitudinal flow relief areas, such as a series of holes extending longitudinally through the valve element, and disposed radially outwardly of the O-ring seal.

A spring is located outwardly of the valve element to bias the valve element toward and against the O-ring seal. Once again, the longitudinal dimension is minimized by using a laterally oriented spring, preferably a wave-type spring. A retainer, preferably in the form of a ring, is mounted in the outer end of the throughbore, and its longitudinal position adjusted to provide the desired amount of loading on the spring. A filter may be installed in the center of the retaining ring to prevent cuttings and other debris from entering and interfering with the valve assembly.

A large portion of the value of the present invention is believed to reside in its simplicity, e.g. the use of a simple O-ring on a simple annular carrier as a valve seat, the simple stemless plate-like valve element, and generally planar seating surfaces for engaging opposite ends of the O-ring. However, the arrangement also causes the valve to be hydrostatically loaded to a closed position. This is because, when the valve element is urged into its closed position, the O-ring is compressed longitudinally. Thus, the axial end surfaces of the O-ring which seal against the cap shoulder and valve element respectively do not merely provide line contact, but rather small annular contact areas. The lubricant pressure tending to open the valve thus acts on an effective piston area defined by the inner diameters of these annular contact areas on the O-ring seal, whereas the external pressure tending to close the valve acts on a larger effective piston area defined by the outer diameters of the annular contact areas on the O-ring seal. Thus, even if the pressures on opposite sides of the valve are equal, there will be a hydrostatic load tending to hold the valve in its closed position.

Initially, there was some fear that this might be a disadvantage, i.e. that the hydrostatic loading might become too great in the high pressure downhole environment and prevent the valve from opening at the proper time. However, tests have revealed, somewhat surprisingly, that this hydrostatic loading was not only not a problem, but rather an advantage, serving, so to speak, to assist the spring in biasing the valve to its closed position.

Another advantage of the small simplified form of the valve assembly, allowing it to be mounted in the reservoir cap, is that it can be adapted into many existing bits, simply by providing an appropriate throughbore in the reservoir cap, rather than requiring entirely new bit construction, or even new reservoir cap construction. Since all valve parts can be of about the same outer diameter, and the seating surface in the cap is planar, even the machining of the throughbore is simplified. Further adding to the economical nature of the invention is the fact that two of the three main valve parts, i.e. the seat and the spring, can be purchased "off the shelf." The third part, the valve element, can be very simply machined. Related parts are merely the reservoir cap itself, which, at most, needs some simple additional machining, and a simple retainer ring which can be press-fitted into the throughbore in the reservoir cap and provided with a filter, e.g. of ordinary wire mesh or an appropriate type of foam. This results in considerable savings, since a new drill bit of the type in question typically costs about $4,000 to $12,000.

Accordingly, it is a principal object of the present invention to provide a roller-type well drilling bit with a one-way pressure relief valve assembly mounted in the reservoir cap.

Another object of the present invention is to provide such a bit in which the valve assembly is adapted to provide its own hydrostatic load urging it to its closed position.

Still another object of the present invention is to provide a simple one-way valve assembly, including relatively few parts, and those parts having relatively small longitudinal dimensions and generally uniform outer diameters.

Still other objects, features and advantages of the present invention will be made apparent by the following detailed description, the drawings and the claims.

DETAILED DESCRIPTION

Figure 1:
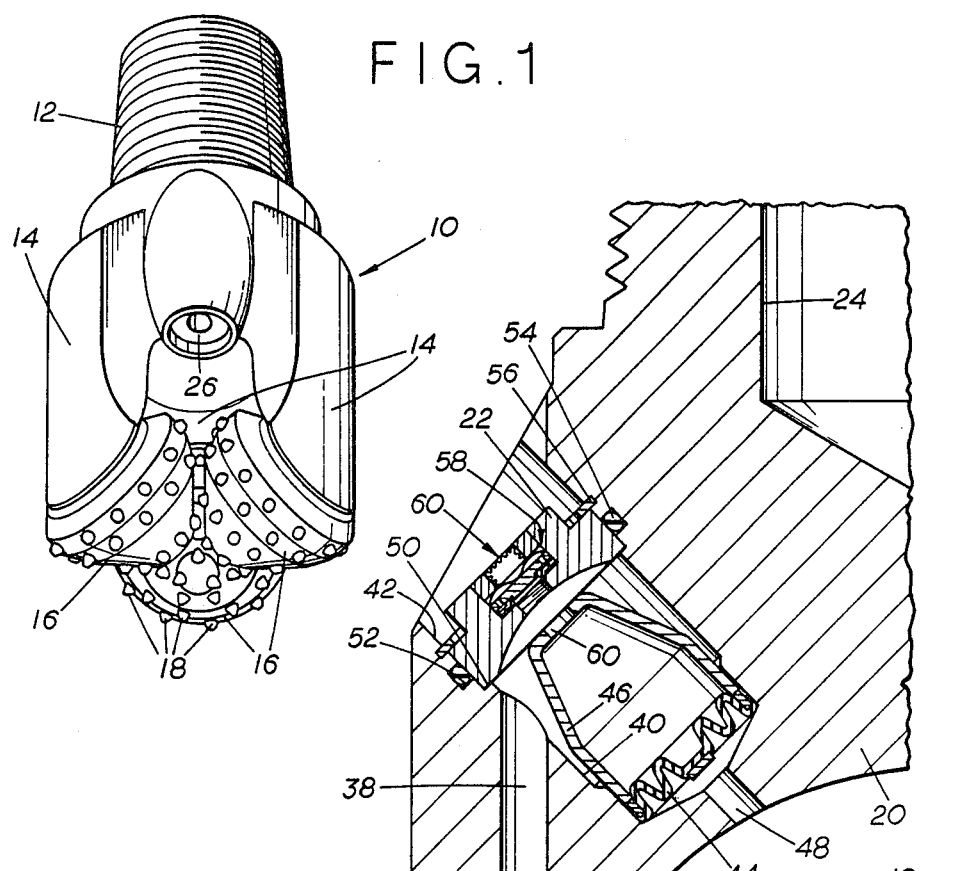
FIG. 1 is a perspective view of a drill bit of the type to which the present invention is applicable.

FIG. 1 illustrates a more or less conventional roller-type drill bit 10. The bit 10 includes a bit body assembly comprising a main body member 20 and reservoir caps 22 (shown and described in greater detail in connection with the other figures). The main bit body member 20 includes a shank, the upper end of which forms a threaded pin 12 for assembling the bit into the drill string. The pin 12 is hollowed as indicated at 24 (FIG. 2) so that mud can be pumped into the bit body through the drill string. In a manner well known in the art, hollow 24 is communicated with a series of ports or nozzles, one of which is shown at 26, through which drilling fluid or mud is circulated. The main bit body member 20 further includes three legs 14 extending downwardly from the upper shank. Each leg 14 terminates in an inwardly turned bearing pin structure 26.

Figure 2:
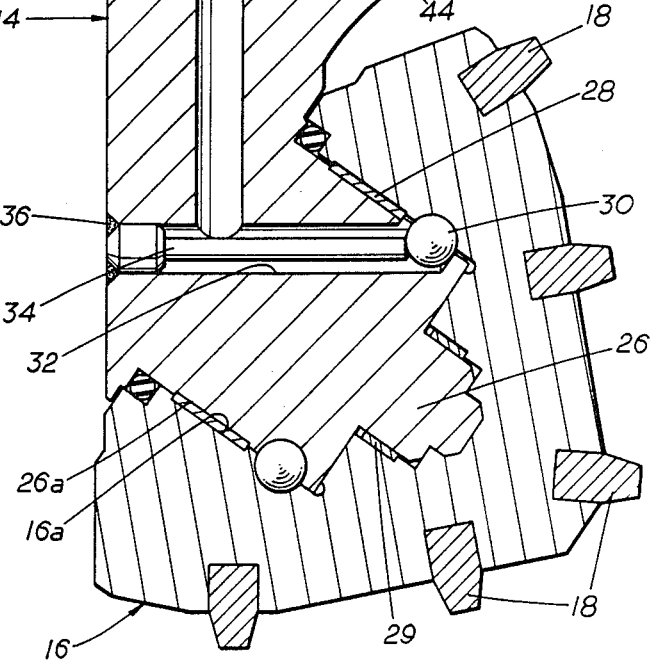
FIG. 2 is an enlarged longitudinal cross-sectional view through one leg of the drill bit and showing the valve assembly of the present invention.

Referring now also to FIG. 2, pin structure 26 has a generally annular outer surface 26a which is received within and opposes an annular inner surface 16a of a respective roller cone type cutter 16. The outer surface of each cone cutter 16 carries a plurality of cutting structures in the form of tungsten carbide compacts 18, or any other type of structure as well known in the art.

Suitable bearings such as anti-friction sleeves 28 and 29, are interposed between the opposed surfaces 16a and 26a of the cutter and pin to facilitate relative rotation of the cutter 16 and pin structure 26. The bearing sleeves may be press-fitted onto the pin or into the cutter, for example. Alternatively, roller type bearings can be employed. The surfaces 16a and 26a are provided with respective semicircular annular recesses which, in use, are opposed so that, together, they define a race for a set of balls 30. Although the balls are commonly referred to as "ball bearings," their primary function in this type of bearing structure is to lock the cone cutter 16 onto the pin structure 26. More specifically, after the balls have been loaded into the bearing area through a passage 32 in the leg 14, an undersized retaining pin 34 is emplaced in passage 32 and then welded into place as indicated at 36.

Passage 32 also serves as part of the lubricant passage means for the bearing, and pin 34 is undersized to ensure that lubricant can flow around it and into the bearing area. A second branch of lubricant passage means is defined by a bore 38 intersecting bore 32 and extending upwardly through the respective leg 14.

Distal the bearing area, and more specifically, at the upper end of lubricant passage 38 and communicating therewith, there is a lubricant reservoir cavity 40 formed in the main bit body 20. Cavity 40 has an assembly opening 42 opening through the outer side of the bit body 20 in the inclined area where the leg 14 joins the shank of the bit. A compensator, including a folded, elastomeric diaphragm 44, extending across a wide open end of a protector sleeve 46, is installed in the reservoir through opening 42. The outer edge of diaphragm 44 is molded about a ring 45 which abuts the adjacent end of sleeve 46. Ring 45 is so sized that the diaphragm 44 thus seals against the walls of the reservoir cavity 40. As can be seen, the assembly opening 42 and passage 38 are located on one side of the seal thus formed. A mud pressure port 48, to be explained more fully below, is disposed on the other side of diaphragm 44, and communicates the reservoir cavity 40 with the pressure outside the bit, more specifically in the area known as the "crotch" of the bit body.

Although the pressure relief valve to be described hereinafter protects the diaphragm 44, the diaphragm is further provided with a metal protector disc 47, opposing port 48. This protects the diaphragm 44 during contact with port 48.

Diaphragm 44 is movable in response to a pressure differential thereacross. Thus, during normal drilling conditions, the mud pressure or well pressure communicated through port 48 will cause diaphragm 44 to move toward the other end of the reservoir cavity 40, such movement being permitted by straightening of the folds of the diaphragm, and this gradually forces lubricant through the aforementioned passageway system into the bearing area as needed, while controlling the pressure differential across the diaphragm.

As previously mentioned, the bit body assembly also comprises reservoir caps, one of which is shown at 22. Each cap is fitted into the assembly opening 42 after emplacement of the compensator 44, 46. Opening 42 is in the form of a counterbore to cavity 40, so that a shoulder 50 is provided to serve as a stop for the cap 22. Opening 42 also has an annular recess 52 which receives an O-ring 54 to seal between the reservoir cap 22 and the main bit body. Reservoir cap 22 is removably retained by a snap ring 56 interengaging between a groove in opening 42 and a shoulder formed on cap 22. When installed, cap 22 closes and forms a wall of cavity 40.

Figure 3:
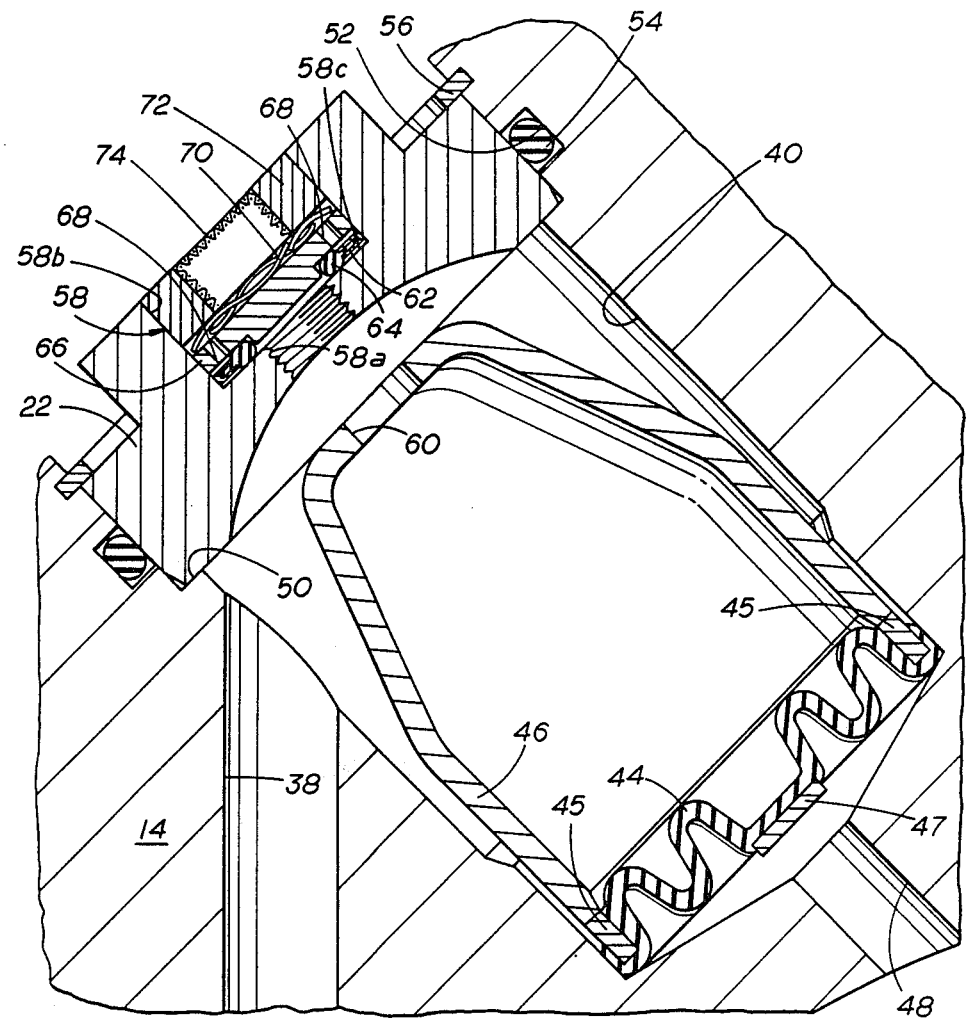
FIG. 3 is a further enlarged cross-sectional detailed view, in the same plane as FIG. 2, showing the reservoir area of the bit.

Referring now to FIG. 3 jointly with FIG. 2, cap 22 has a central throughbore 58. The inner end 58a of throughbore 58 is threaded, and the outer end 58b of throughbore 58 is smooth walled and of larger diameter, so that a rather broad, planar, outwardly facing shoulder 58c is formed in throughbore 58. During assembly of the bit, a grease gun type fitting is inserted in throughbore 58 and threaded into its inner portion 58a. A suitable lubricant, typically highly viscous, is thus injected into the area on the opposite side of diaphragm 44 from port 48. The lubricant can flow through hole 60 into the area within sleeve 46. It can also flow into the area between sleeve 46 and the inner walls of reservoir 40, through passages 38 and 32 and into the bearing area. After injection of the lubricant, suitable tests can be done.

After injection of the lubricant and testing, a valve assembly 60 is installed in the enlarged outer portion 58b of bore 58. The valve and its installation are as follows (referring particularly to FIGS. 3 and 6): First, the valve seat is installed adjacent shoulder 58. The valve seat consists of an "off the shelf" type seal member including an outermost carrier ring 62 and an O-ring 64 carried on the inner diameter thereof. As can be seen, for example, in FIGS. 4 and 5, the longitudinal dimension or thickness of the O-ring 64 is greater than that of the ring 62. Thus, both axial ends of O-ring 64 are exposed or available for sealing contact with simple, broad, planar surfaces. (In this discussion, the bore 58 will be considered to define the longitudinal direction for the valve assembly 60 and terms such as "longitudinal," "axial," "radial," etc. will be used accordingly.)

Next, the valve element 66 is installed adjacent the seat 62, 64. Valve element 66 is in the form of a simple machined plate-like disk having a solid central area 66a having a planar seating surface 66b to sealingly engage O-ring 64. The outer diameter of element 66 is sized for a sliding fit in bore section 58b. Although fluid could flow around the outer diameter of element 66, holes 68, extending longitudinally through element 66 and disposed radially outwardly of O-ring 64, are provided to facilitate fluid flow. Instead of holes 68, other kinds of longitudinal flow relief areas, such as slots or flats machined into the cylindrical peripheral surface of element 66 could be employed.

Inwardly of surface 66b, solid central area 66a has a seal restraint 66c which projects longitudinally into the seat 62, 64 adjacent the inner diameter of seal 64. The longitudinal extent of restraint 66c is less than that of seal 64 to allow the seal to be compressed in use. Restraint 66c prevents seal 64 from being separated from its carrier and extruded into bore section 58a. Restraint 66c need not but may seal against the inner diameter of seal 64.

Next, a wave-type spring 70 is installed adjacent valve element 66. Spring 70 is "laterally oriented," by which is meant that its major direction is lateral, rather than longitudinal, as might be the case with a coil spring by way of contrast. At this point, it is noted that the valve element 66 and seat 62, 64 are also laterally oriented, and indeed have very small longitudinal dimensions. These factors, together with the simplified forms of the valve parts, and the sliding fit between valve element 66 and bore section 58b which eliminates the need for a valve stem, all contribute to the small size, and especially the small longitudinal dimension, of the valve assembly, thereby making it particularly easy to install in a conventional reservoir cap.

To load the spring, and thus the valve element 66, to a desired degree, a simple retainer ring 72 is press-fitted into the outermost part of throughbore section 58b. The depth to which ring 72 is driven serves to control the amount of loading. Again, because of the relatively small sizes of the parts, which can be machined to fairly close tolerances, this load can be very precisely controlled. Furthermore, and again because of the small sizes of the parts, the load can be set to cause the valve to open only at a relatively high pressure, e.g. about 175 psi. Other means of firing the retainer ring with respect to the cap are possible For example, the ring 72 could be threaded into the cap and then retained with a set pin, or it could be held with a snap ring.

Finally. to prevent debris from entering and interfering with proper operation and/or sealing of the valve, a filter, in this case shown as an inverted cup 74 of wire mesh, is fixedly mounted in the central opening of ring 72.

It can be appreciated that conventional reservoir caps can easily be modified to accommodate the simple valve assembly of the present invention, thus resulting in cost savings. Even this machining is simplified since a cylindrical section 58b can properly accommodate all valve parts and retainer 72.

Figure 4:
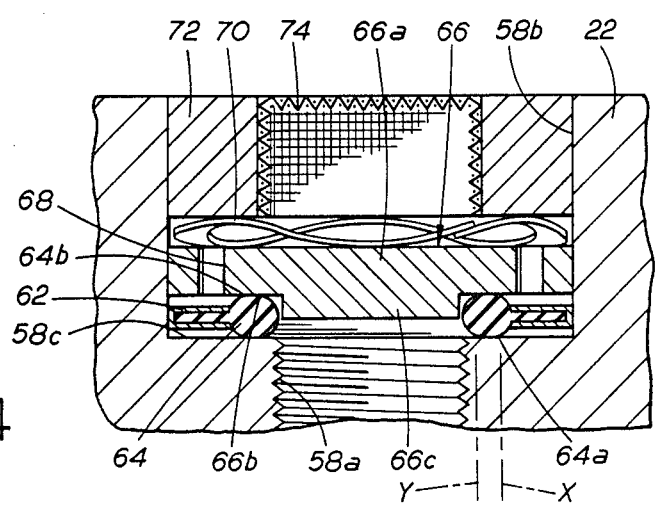
FIG. 4 is a still further enlarged detailed view of the valve assembly in closed position.
Figure 5:
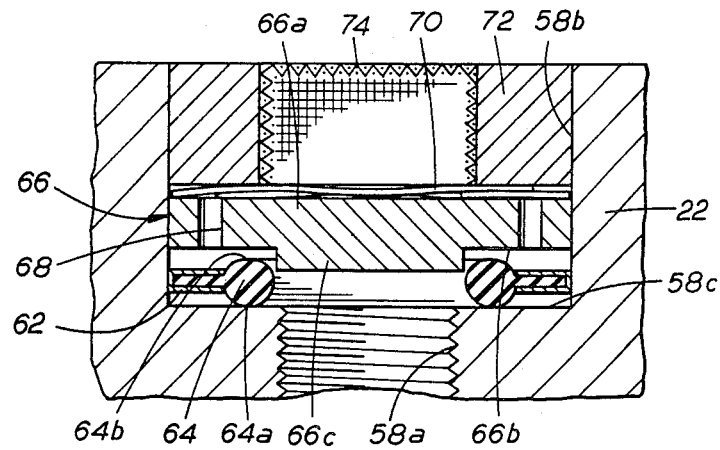
FIG. 5 is a view similar to that of FIG. 4 showing the valve in open position, the amount of valve movement being exaggerated for purposes of illustration.
Figure 6:
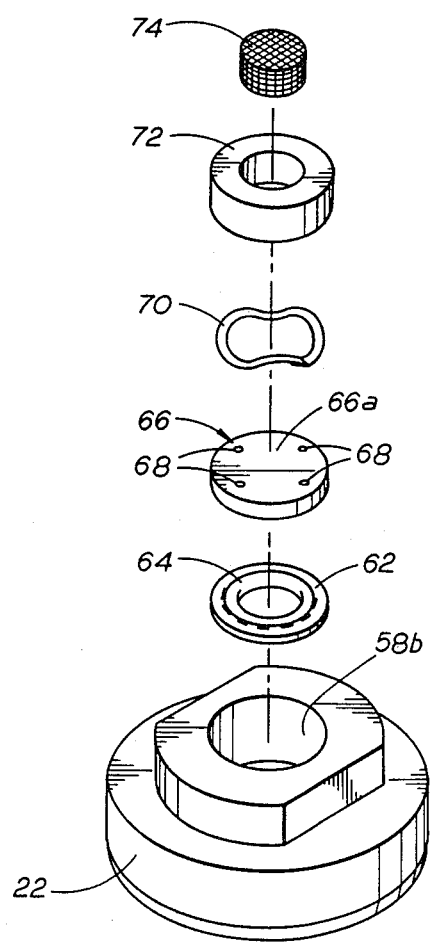
FIG. 6 is an exploded view of the valve assembly and related parts.

FIG. 4 shows the valve in its closed position. FIG. 5 shows how, when the pressure of the lubricant becomes great enough, this pressure, bearing against valve element 66, can compress spring 70, to allow fluid flow around seal 64. Such flow will continue until the pressure of the lubricant is reduced to that it no longer overcomes the force of the spring 70. The movement of valve element 66 is shown exaggerated in FIG. 5, for clarity of illustration, and it should be understood that, in reality, only a slight movement would occur to permit leakage of fluid from throughbore section 58a around O-ring 64, through holes 68, through spring 70, and out through the center of ring 72 and through mesh filter 74. As shown, fluid can flow around the ID and top side of O-ring 64. However, were O-ring 64 sealed to restraint 66c, fluid could still flow under O-ring 64 and past unsealed carrier 62.

Referring again to FIG. 4, it can be seen that, when the valve is closed and loaded, O-ring 64 is compressed so that its axial end sealing areas, 64a and 64b, have significant radial extent, specifically outer diameters at x and inner diameters at y. The lubricant pressure bears on an area bounded by the diameter y, whereas the pressure from outside the bit bears on an area bounded by the diameter x. Thus, the valve assembly is hydrostatically loaded. By this is meant that, even if the pressures on opposite sides of the valve element are equal, the outside pressure, bearing on the larger effective piston area, will tend to bias the valve to its closed position. It has been found, experimentally, that this hydrostatic loading is not only not detrimental, but indeed, is an advantage, assisting spring 70, for example, in preventing premature lubricant loss due to surge effects as the bit is being run into the borehole.

Various modifications of the preferred embodiment described above will suggest themselves to those of skill in the art. Accordingly, it is intended that the scope of the present invention be limited only by the following claims.

What is claimed is:

1. A roller-type well drilling bit comprising:
a bit body assembly comprising a main bit body including a bearing pin structure having an annular outer surface, said body having lubricant passage means opening through said outer surface of said pin structure and extending through the interior of said bit body, a lubricant reservoir cavity communicating with said lubricant passage means distal said outer surface of said pin structure;
said bit body assembly defining a mud pressure port communicating said lubricant reservoir cavity with the exterior of said bit body distal said lubricant passage means;
a compensator disposed in said reservoir cavity and sealed thereacross between said lubricant passage means and said mud pressure port and movable in response to a pressure differential thereacross;
said lubricant reservoir cavity having an assembly opening through the exterior of said main bit body, said assembly opening being sized and positioned to permit installation of said compensator into said reservoir cavity through said assembly opening;
said bit body assembly further including a reservoir cap removably mounted in said assembly opening;
a rolling cutter rotatably mounted on said pin structure and having an annular inner surface opposed to said outer surface of said pin structure;
and a one-way pressure relief valve assembly mounted in said reservoir cap, said valve assembly including a valve element movable between open and closed positions, the valve element being mounted so that its movement from closed position to open position is in an outward direction, said valve assembly further including means operatively associated with said valve element for loading said valve element to its closed position.

2. The apparatus of claim 1 wherein said valve assembly is disposed on the opposite side of said compensator from said mud pressure port.

3. The apparatus of claim 2 wherein said reservoir cap is disposed on the opposite side of said compensator from said mud pressure port.

4. The apparatus of claim 3 wherein said reservoir cap has a throughbore receiving said valve assembly and defining a longitudinal direction thereof, said throughbore having an outwardly facing annular shoulder;
wherein said valve assembly comprises:
a seat member comprising an annular seal disposed adjacent and sealingly engageable with said shoulder,
a valve element disposed adjacent said seat member on the opposite side from said shoulder and comprising a solid central portion sealingly engageable with said seal, said valve element being longitudinally movable toward and away from said seal;
and wherein said loading means is operative to urge said valve element against said seal.

5. The apparatus of claim 4 wherein said loading means comprises a laterally oriented spring disposed on the opposite side of said valve element from said seat member;
and further comprising retainer means cooperative between said reservoir cap and said spring to compress said spring.

6. The apparatus of claim 5 wherein said spring is a wave-type spring.

7. The apparatus of claim 5 wherein said retainer means comprises a retainer ring connected to said reservoir cap.

8. The apparatus of claim 7 wherein said retainer ring is adjustable longitudinally in said throughbore upon assembly to vary the load on said spring.

9. The apparatus of claim 8 wherein said retainer ring is press-fitted into said throughbore.

10. The apparatus of claim 7 further comprising filter means disposed in the center of said retainer ring.

11. The apparatus of claim 5 wherein said seat comprises an annular carrier, said seal being resilient and carried at the inner diameter of said carrier.

12. The apparatus of claim 11 wherein said valve element comprises a laterally oriented plate-like member.

13. The apparatus of claim 12 wherein said valve element comprises seal restraint means extending longitudinally into said seat member adjacent the inner diameter of said seal by a distance less than the relaxed longitudinal extent of said seal.

14. The apparatus of claim 13 wherein the longitudinal dimension of said seal is greater than that of the adjacent portion of said carrier.

15. The apparatus of claim 14 wherein said seal is an O-ring, and said valve element has a generally planar seating surface engageable with said O-ring.

16. The apparatus of claim 12 wherein said valve element has a sliding fit in said throughbore and has at least one longitudinal flow relief area disposed radially outwardly of said seal.

17. The apparatus of claim 4 wherein said seal is an O-ring.

18. The apparatus of claim 1 wherein said valve assembly comprises means adapted to provide such loading hydrostatically.

19. A one-way pressure relief valve assembly for venting a lubricant reservoir of a roller-type well drilling bit, said valve assembly comprising:
 a seat comprising an annular carrier and a resilient O-ring seal carried at the inner diameter of said carrier, the O-ring seal being of greater longitudinal dimension than of the carrier at its inner diameter, whereby axially opposite ends of said O-ring seal are sealingly engageable with broader axially adjacent surfaces;
 a plate-like valve element having a solid central portion with a generally planar seating surface sized for sealing engagement with said seal, and further comprising seal restraining means extending longitudinally into said seat adjacent the inner diameter of said seal, in both closed and open positions of said valve assembly by a distance less than the relaxed longitudinal extent of said seal;
 and spring means disposed on the opposite side of said valve element from said seat for urging said valve element toward said seat.

20. The apparatus of claim 19 wherein said valve element has at least one longitudinally extending void area for flow relief disposed radially outwardly of said O-ring seal and extending longitudinally through said valve element 21. The apparatus of claim 19 wherein said spring means is a wave spring.

22. The apparatus of claim 19 wherein said O-ring seal is of such greater longitudinal dimension as to the entirety of said carrier.

23. The apparatus of claim 19 wherein said seat and said valve element have approximately equal outer diameters.

24. A roller-type well drilling bit comprising:
 a bit body assembly comprising a main bit body including a bearing pin structure having an annular outer surface, said bit body having lubricant body passage means opening through said outer surface of said pin structure and extending through the interior of said bit body, a lubricant reservoir cavity communicating with said lubricant passage means distal said outer surface of said pin structure and said lubricant reservoir cavity having an assembly opening through the exterior of said main bit body;
 said bit body assembly further including a reservoir cap removably mounted in said assembly opening, said reservoir cap having a throughbore defining a longitudinal direction, and said throughbore having an outwardly facing annular shoulder;
 said bit body assembly defining a mud pressure port communicating said lubricant reservoir cavity with the exterior of said bit body distal said lubricant passage means;
 a rolling cutter rotatably mounted on said pin structure and having an annular inner surface opposed to said outer surface of said pin structure;
 a compensator disposed in said reservoir cavity and sealed thereacross between said lubricant passage means and said mud pressure port and movable in response to a pressure differential thereacross;
 and a one-way pressure relief valve assembly mounted in said throughbore in said reservoir cap, and aligned in said longitudinal direction, said valve assembly comprising:
  a seat member comprising an annular seal disposed adjacent and sealingly engageable with said shoulder,
  a valve element disposed adjacent said seat member on the opposite side from said shoulder and comprising a solid central portion sealingly engageable with said seal, said valve element being movable longitudinally toward and away from said seal between respective closed and open positions, the movement from closed position to open position being in an outward direction,
  and means loading said valve element to its closed position, said loading means being operatively associated with said valve element to urge said valve element against said seal.

* * * * *